US012425918B2

United States Patent
Gradus et al.

(10) Patent No.: US 12,425,918 B2
(45) Date of Patent: Sep. 23, 2025

(54) DYNAMIC VoLTE ALLOCATION (DVA)

(71) Applicant: Parallel Wireless, Inc., Nashua, NH (US)

(72) Inventors: Nimrod Gradus, Givatayim (IL); Ido Shaked, Alfei Menashe (IL); Benjamin Abramovsky, Petah Tiqwa (IL)

(73) Assignee: Parallel Wireless, Inc., Nashua, NH (US)

( * ) Notice: Subject to any disclaimer, the term of this patent is extended or adjusted under 35 U.S.C. 154(b) by 455 days.

(21) Appl. No.: 17/833,353

(22) Filed: Jun. 6, 2022

(65) Prior Publication Data
US 2022/0394549 A1    Dec. 8, 2022

Related U.S. Application Data

(60) Provisional application No. 63/197,043, filed on Jun. 4, 2021.

(51) Int. Cl.
*H04W 28/06* (2009.01)
*G10L 19/22* (2013.01)

(52) U.S. Cl.
CPC ............ *H04W 28/06* (2013.01); *G10L 19/22* (2013.01)

(58) Field of Classification Search
CPC ......... H04W 28/06; G10L 21/00; G10L 19/22
See application file for complete search history.

(56) References Cited

U.S. PATENT DOCUMENTS

2021/0029773 A1*  1/2021  Majumder ............ H04W 8/183
2021/0343304 A1*  11/2021  Qiu ........................ G10L 21/02

OTHER PUBLICATIONS

"Telecommunications and Internet converged Services and Protocols for Advanced Networking (TISPAN); IP Multimedia: H.248 Profile for controlling Multimedia Resource Function Processors (MRFP) in the IP Multimedia System (IMS); Protocol specification", [3GPP TS 29.333 Release 7, modified], ETSI TS 183 031 V2.0.0 (Feb. 2008).
Schulzrinne et al.: "RTP Profile for Audio and Video Conferences with Minimal Control", https://datatracker.ietf.org/doc/html/rfc3551, Jul. 2003.
"Appendix II: A comfort noise payload definition for ITU-T G.711 use in packet-based multimedia communication systems", Recommendation G.711/Appendix II (Feb. 2000).

* cited by examiner

*Primary Examiner* — Khaled M Kassim
*Assistant Examiner* — Ahmed K Jaber
(74) *Attorney, Agent, or Firm* — Michael Y. Saji

(57) ABSTRACT

A method, computer readable media and a system for determining a Voice over LTE (VoLTE) codec is presented. In one embodiment a method includes discovering a packet header size used in a session using a Silence Insertion Descriptor (SID); inspecting downlink packet sizes coming into a receive buffer; determining when three consecutive packet sizes are greater than zero, then setting a first factor, a second factor, and a third factor equal to zero; calculating a header size; and determining a voice encoding codec by subtracting a header overhead value from the packet size.

18 Claims, 10 Drawing Sheets

DYNAMIC VoLTE ALLOCATION (DVA)

CROSS-REFERENCE TO RELATED APPLICATIONS

This application claims priority under 35 U.S.C. § 119(e) to U.S. Provisional Pat. App. No. 63/197,043, filed Jun. 4, 2021, titled "Dynamic VoLTE Allocation (DVA)" which is hereby incorporated by reference in its entirety for all purposes. This application also This application hereby incorporates by reference, for all purposes, each of the following U.S. Patent Application Publications in their entirety: US20170013513A1; US20170026845A1; US20170055186A1; US20170070436A1; US201700-77979A1; US20170019375A1; US20170111482A1; US-20170048710A1; US20170127409A1; US20170064621A1; US20170202006A1; US20170238278A1; US2017-0171828A1; US20170181119A1; US20170273134A1; US-20170272330A1; US20170208560A1; US20170288813A1; US20170295510A1; US20170303163A1; and US-20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes.

BACKGROUND

During a VoLTE session, the user equipment's (UE) uses an audio codec, such as, EVS,AMR-WB,AMR-NB, etc. The UEs can dynamically change the codec based on the RF channel condition, network congestion or signaling from the eNB. The audio codec used defines a bit rate needed for the voice call every 20 milliseconds (msec) and therefore, requires resources for transmissions in uplink and downlink. Those downlink VoLTE packets coming in for resource allocation in the eNB are allocated based on the VoLTE packet sizes which are not fixed, and, apart from the dynamic voice codec, depends on the network headers (UDP, IP, RTP).

SUMMARY

When allocating downlink resources during a VoLTE session, the eNB allocates the downlink VoLTE packet sizes without knowing the actual codec used by the users, since VoLTE call packets are comprised of the voice codec used by the users and the upper network headers. In this invention, we propose a way to infer the actual codec used the users from the downlink packets coming in from the network.

In one example a method for determining a codec is presented. The method includes discovering a packet header size used in a session using a Silence Insertion Descriptor (SID); inspecting downlink packet sizes coming into a receive buffer; determining when three consecutive packet sizes are greater than zero, then setting a first factor, a second factor, and a third factor equal to zero; calculating a header size; and determining a voice encoding codec by subtracting a header overhead value from the packet size.

DETAILED DESCRIPTION

Figure 1:
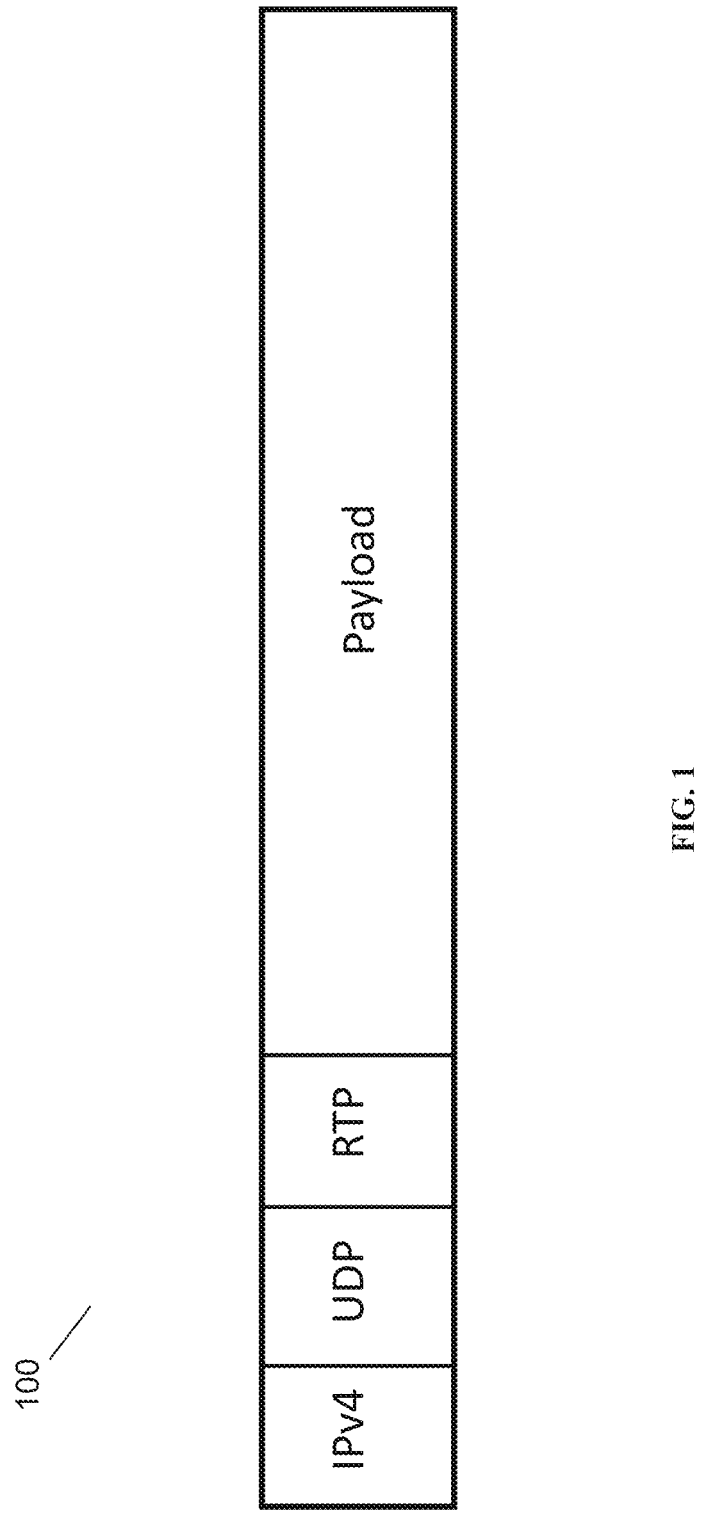
FIG. 1 is a diagram showing an example VoLTE packet.

Referring to FIG. 1, downlink VoLTE packets 100 coming in for resource allocation in the eNB are allocated based on the VoLTE packet sizes which are not fixed, and, apart from the dynamic voice codec, depends on the network headers (UDP, IP, RTP). The packet may also include a payload.

When UE is in a VoLTE session, due to the aforementioned dynamic behavior of the VoLTE packet sizes, the eNB can't know the audio codec used just by the downlink packet sizes coming into the buffer, and must rely on other complex methods, i.e., Deep Packet Inspection (DPI). Such limitation makes it harder for the eNB to make any smart decisions regarding the UE's codec, such as, triggering an Access Network Bit Rate Recommendation (ANBR), for changing the UE's audio codec to a different one and even make a codec dependent persistent scheduling.

Solution to Problem—in order to find the VoLTE codec used by the users, we first need to discover the VoLTE packet header size used in the session. In this invention, we rely on the Silence Insertion Descriptor (SID) which is sent instead of the VoLTE codec upon a silence in the voice session and persist once every 160 msec. We devised an algorithm for the VoLTE header calculation by inspecting the downlink VoLTE packet sizes coming in to the eNB buffer. The following pseudo code defines the steps for the VoLTE header calculation.

If three consecutive and constant VoLTE packet sizes>0
1. Current Volte Packet size=0
2. VoLTE HeaderOverHead=0
3. Candidate SID=0
4. while VoLTE HeaderOverHead=0

```
If VoLTE_packet_size > Current_Volte_Packet_size
    Candidate_SID = 0
    Current_Volte_Packet_size = VoLTE_packet_size
Else if VoLTE_packet_size < codec_size and Candidate_SID ==0
    Candidate_SID = VoLTE_packet_size
Else If VoLTE_packet_size = Candidate_SID
    Current_Volte_Packet_size = VoLTE_packet_size
    Candidate_SID = 0
Else If Candidate_SID > 0
    VoLTE_HeaderOverHead = Candidate_SID − 7
    Return VoLTE_HeaderOverHead
Wait for next VoLTE_packet_size
    If VoLTE_packet_size = 0 for 160 [msec] and Candidate_SID >
    VoLTE_HeaderOverHead = Candidate_SID − 7
    Return VoLTE_HeaderOverHead
```

Once VoLTE HeaderOverHead is calculated, the UE codec is easily calculated by,

VoLTE_codec=VoLTE_packet_size−VoLTE_HeaderOverHead

Figure 2:
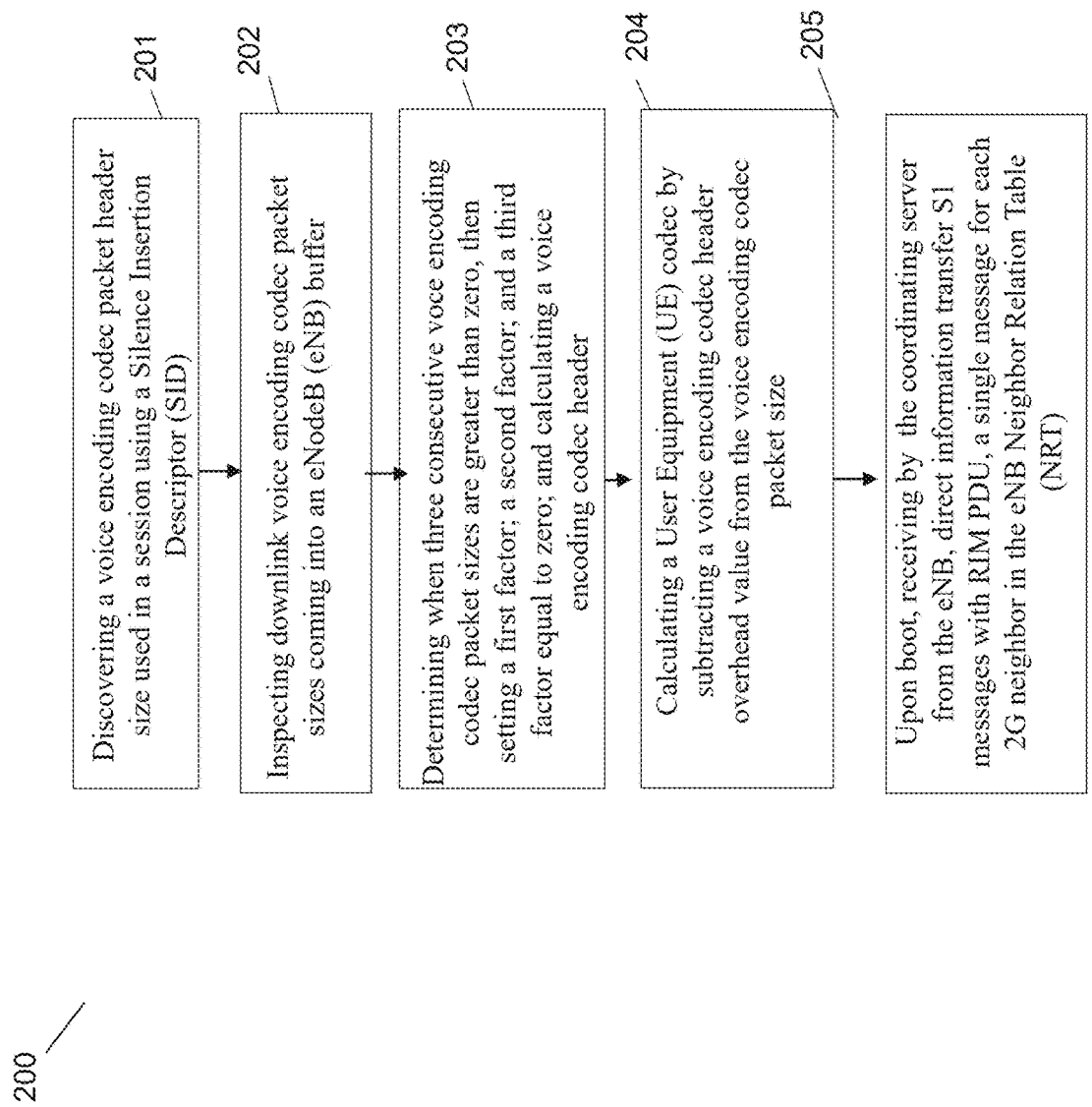
FIG. 2 is a flow diagram showing an embodiment of a method for determining a VoLTE codec, in accordance with some embodiments.

Referring now to FIG. 2, a flow diagram of an embodiment of a method 200 for determining a voice encoding codec is shown. The method begins with processing block 201 which discloses discovering a voice encoding codec (e.g. a VoLTE) packet header size used in a session using a Silence Insertion Descriptor (SID).

Processing block 202 shows inspecting downlink voice encoding codec packet sizes coming into a buffer (e.g. an eNodeB buffer). Processing block 203 recites determining when three consecutive voice encoding codec packet sizes are greater than zero, then setting a first factor; a second factor; and a third factor equal to zero; and calculating a voice encoding codec header.

Processing block 204 discloses calculating a User Equipment (UE) codec by subtracting a voice encoding codec header overhead value from the voice encoding codec packet size. Processing block 205 shows wherein the first factor comprises a Current_voice encoding codec_Packet_size; the second factor comprises a HeaderOverHead; and a third factor comprises a Candidate_SID.

Figure 3:
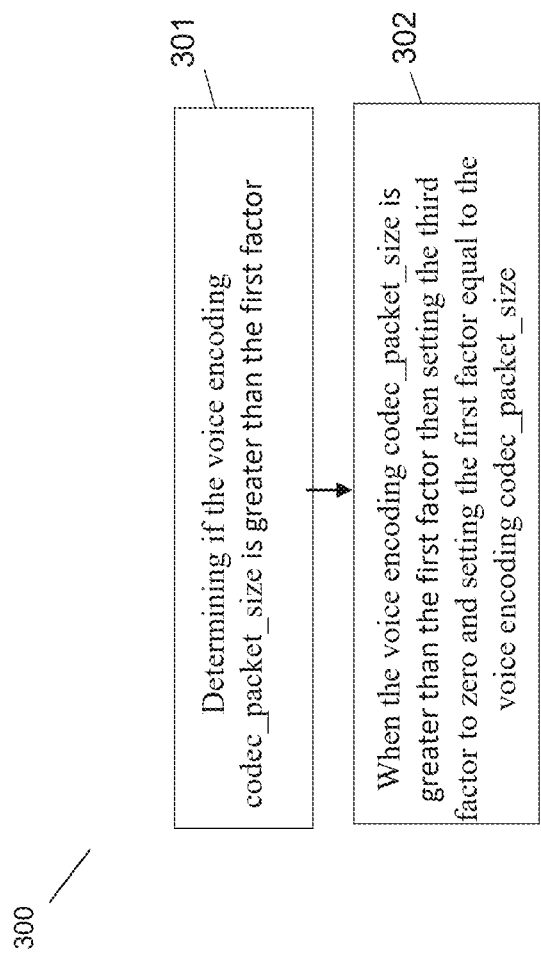
FIG. 3 is a flow diagram showing an embodiment of a method for determining factors used in determining a VoLTE codec, in accordance with some embodiments.

FIG. 3 is a flow diagram for one method of determining some factors used in determining a voice encoding codec codec 300. Processing starts with processing block 301 and shows determining the second factor is equal to zero.

Processing block 302 discloses determining if the voice encoding codec_packet_size is greater than the first factor. Processing block 303 shows when the voice encoding codec_packet_size is greater than the first factor then setting the third factor to zero and setting the first factor equal to the voice encoding codec_packet_size.

Figure 4:
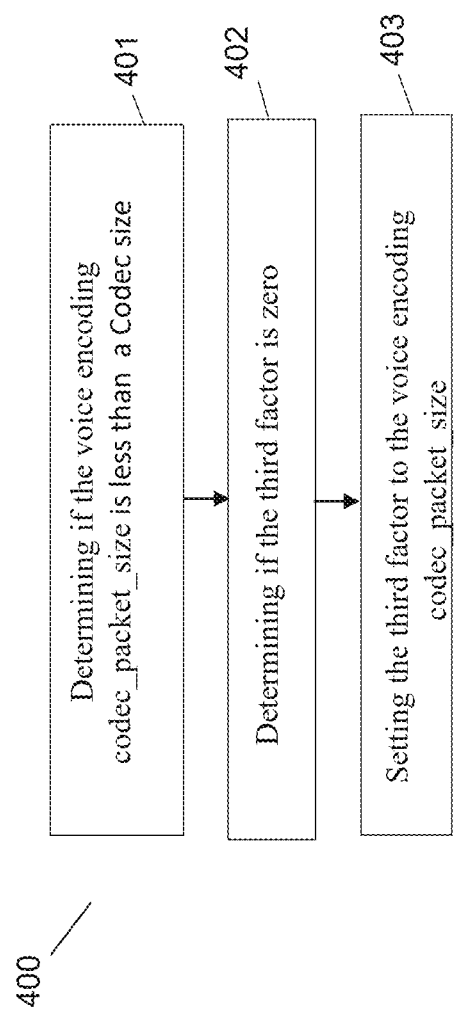
FIG. 4 is a flow diagram showing another embodiment of a method for determining factors used in determining a VoLTE codec, in accordance with some embodiments.

FIG. 4 is a flow diagram for another method of determining some factors used in determining a voice encoding codec codec 400. Processing starts with processing block 401 and begins with determining if the VoLTE_packet_size. is less than a Codec size Processing block shows determining if the third factor is zero. Processing block 403 recites setting the third factor to theVoLTE_packet_size.

Figure 5:
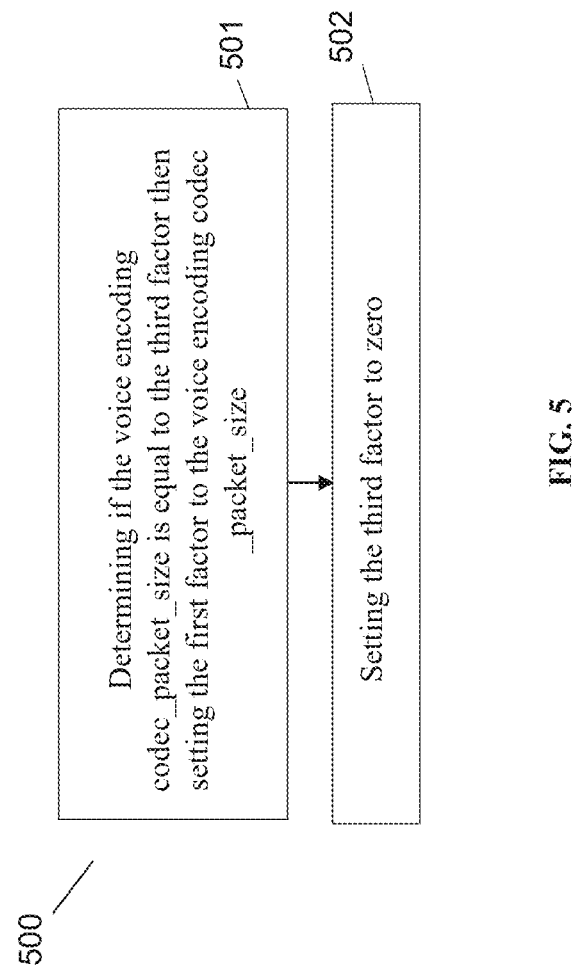
FIG. 5 is a flow diagram showing another embodiment of a method for determining factors used in determining a VoLTE codec, in accordance with some embodiments.

FIG. 5 is a flow diagram for another method of determining some factors used in determining a voice encoding codec codec 500. Processing starts with processing block 501 which shows determining if the VoLTEpacket_size is equal to the third factor then setting the first factor to the voice encoding codec_packet_size. Processing block 502 recites setting the third factor to zero.

Figure 6:
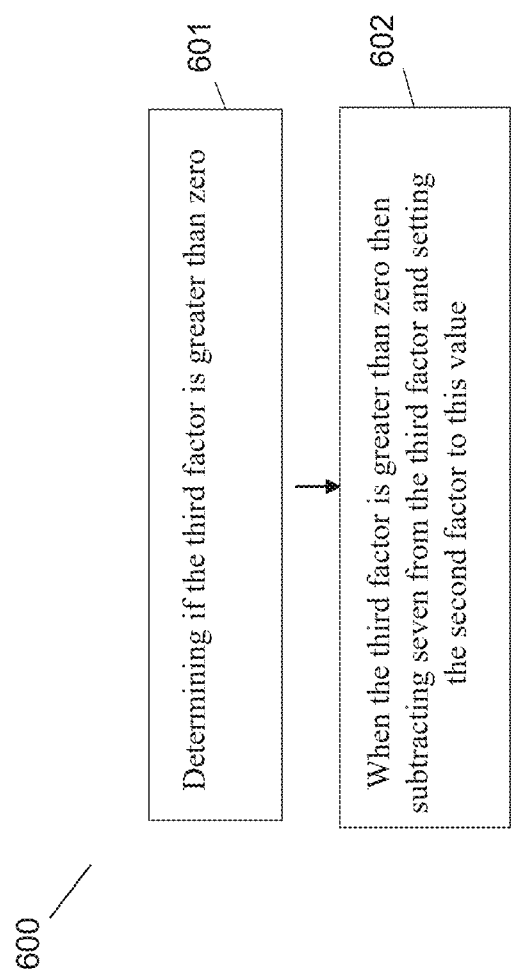
FIG. 6 is a flow diagram showing another embodiment of a method for determining factors used in determining a VoLTE codec, in accordance with some embodiments.

FIG. 6 is a flow diagram for another method of determining some factors used in determining a voice encoding codec 600. Processing starts with processing block 601 which discloses determining if the third factor is greater than zero. As shown in processing block 602, when the third factor is greater than zero then subtracting seven from the third factor and setting the second factor to this value.

Figure 7:
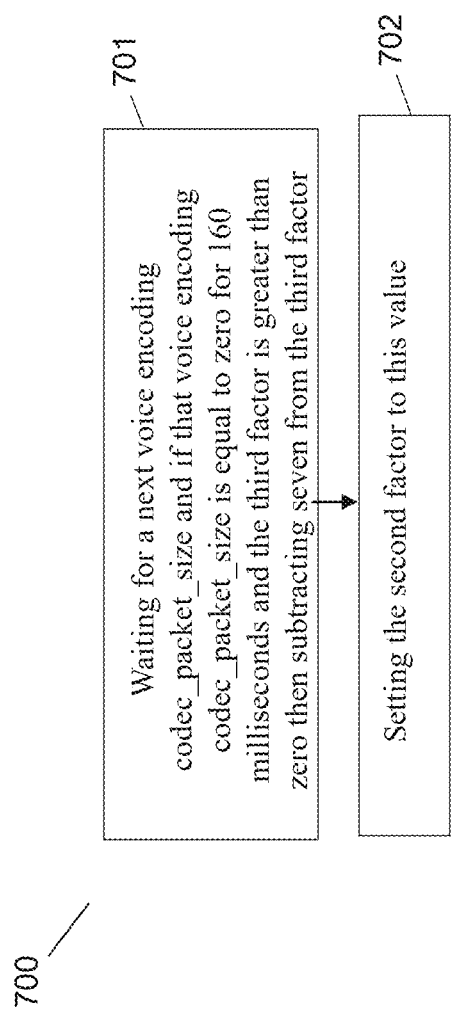
FIG. 7 is a flow diagram showing another embodiment of a method for determining factors used in determining a VoLTE codec, in accordance with some embodiments.

FIG. 7 is a flow diagram for another method of determining some factors used in determining a voice encoding codec 700. Processing starts with processing block 701 which states waiting for a next voice encoding codec_packet_size and if that voice encoding codec_packet_size is equal to zero for 160 milliseconds and the third factor is greater than zero then subtracting seven from the third factor and setting the second factor to this value 702.

Figure 8:
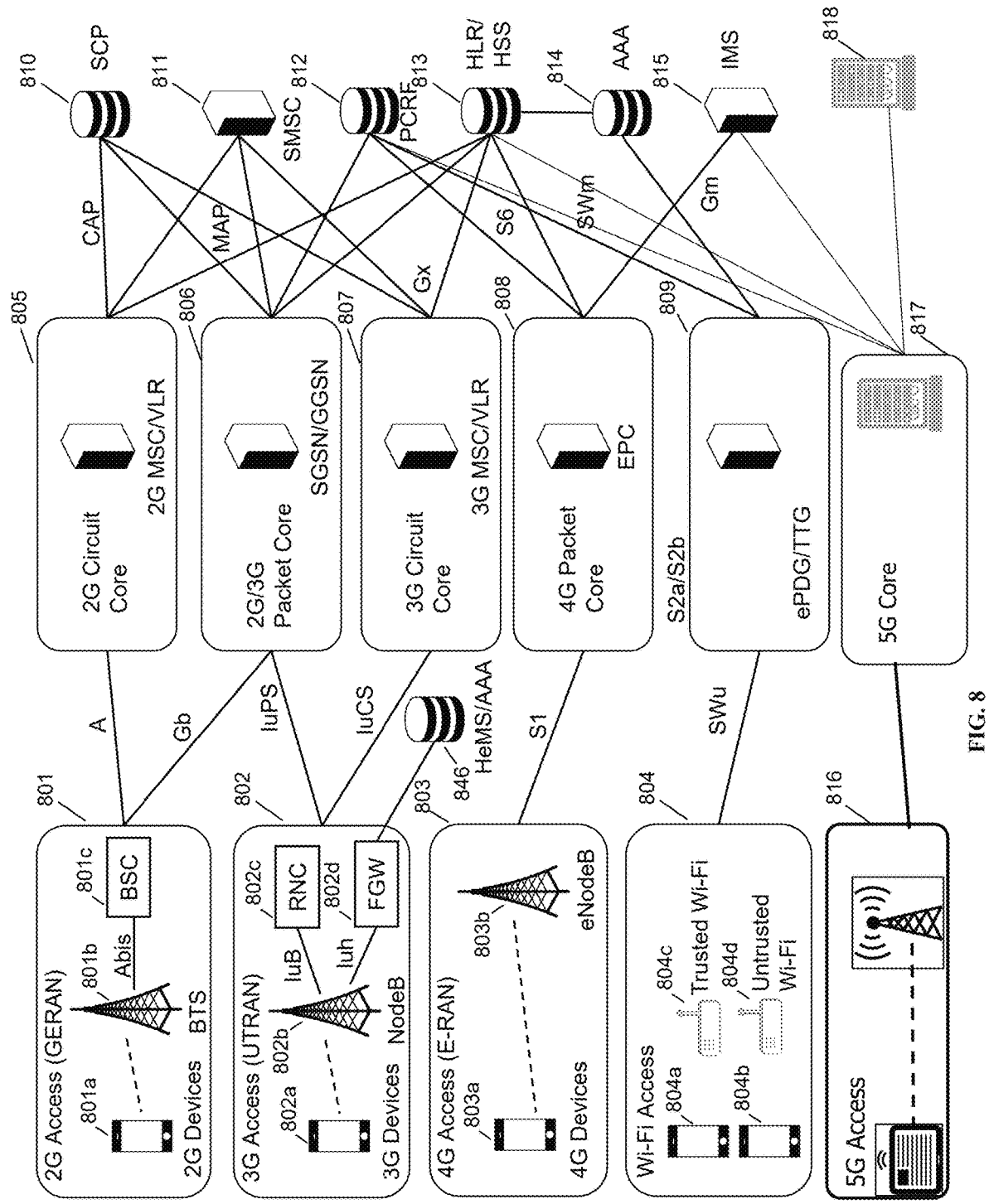
FIG. 8 is a schematic network architecture diagram for 3G and other-G prior art networks.

FIG. 8 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 801a, BTS 801b, and BSC 801c. 3G is represented by UTRAN 802, which includes a 3G UE 802a, nodeB 802b, RNC 802c, and femto gateway (FGW, which in 3GPP namespace is also known as a Home nodeB Gateway or HNBGW) 802d. 4G is represented by EUTRAN or E-RAN 803, which includes an LTE UE 803a and LTE eNodeB 803b. Wi-Fi is represented by Wi-Fi access network 804, which includes a trusted Wi-Fi access point 804c and an untrusted Wi-Fi access point 804d. The Wi-Fi devices 804a and 804b may access either AP 804c or 804d. In the current network architecture, each "G" has a core network. 2G circuit core network 805 includes a 2G MSC/VLR; 2G/3G packet core network 806 includes an SGSN/GGSN (for EDGE or UMTS packet traffic); 3G circuit core 807 includes a 3G MSC/VLR; 4G circuit core 808 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 830, the SMSC 831, PCRF 832, HLR/HSS 833, Authentication, Authorization, and Accounting server (AAA) 834, and IP Multimedia Subsystem (IMS) 835. An HeMS/AAA 836 is present in some cases for use by the 3G UTRAN. The diagram is used to indicate schematically the basic functions of each network as known to one of skill in the art, and is not intended to be exhaustive. For example, 5G core 817 and 818 is shown using a single interface to 5G access 816, although in some cases 5G access can be supported using dual connectivity or via a non-standalone deployment architecture.

Noteworthy is that the RANs 801, 802, 803, 804 and 836 rely on specialized core networks 805, 806, 807, 808, 809, 837 but share essential management databases 830, 831, 832, 833, 834, 835, 838. More specifically, for the 2G GERAN, a BSC 801c is required for Abis compatibility with BTS 801b, while for the 3G UTRAN, an RNC 802c is required for Iub compatibility and an FGW 802d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 9:
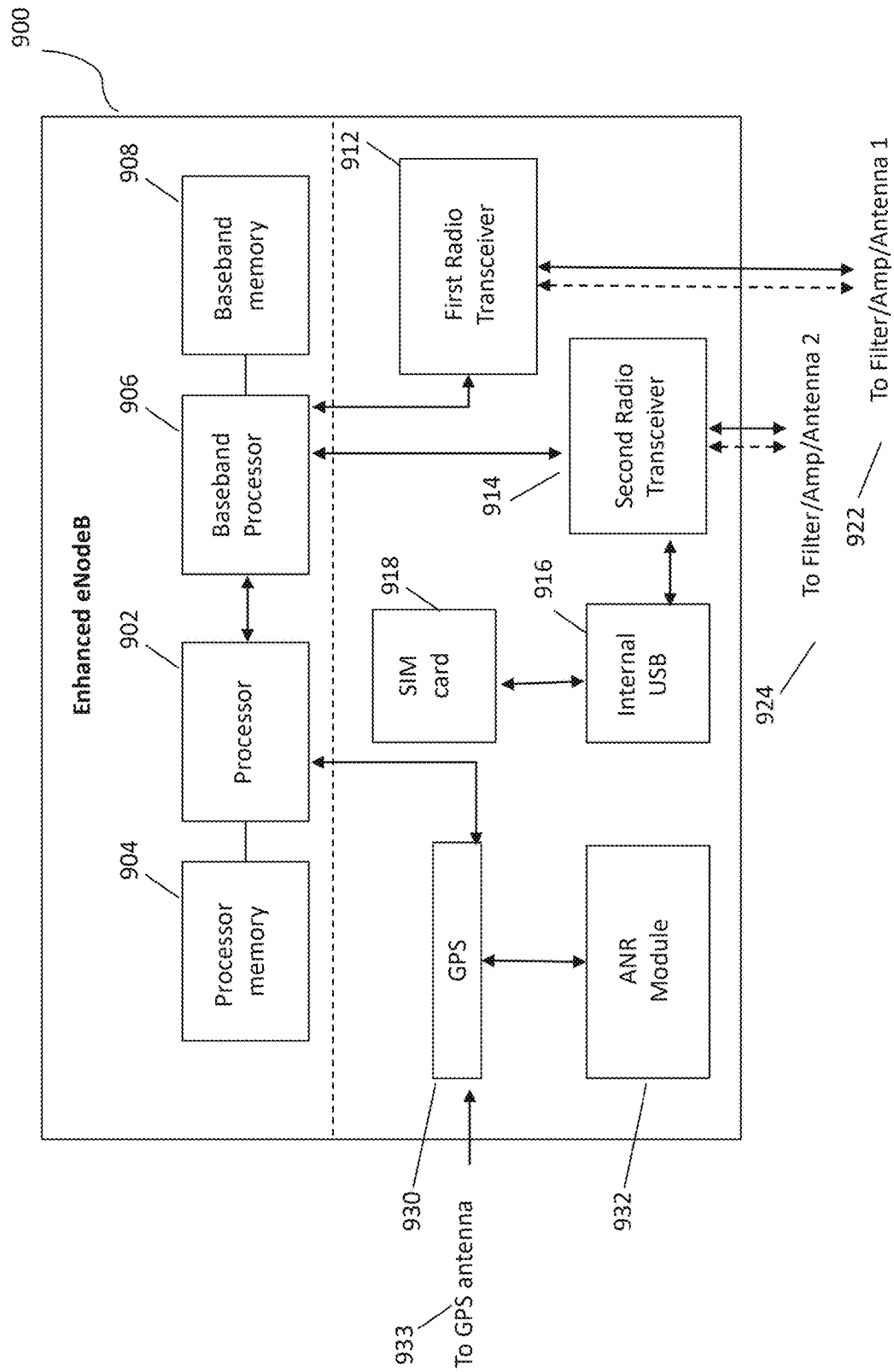
FIG. 9 is an enhanced eNodeB for performing the methods described herein, in accordance with some embodiments.

FIG. 9 is an enhanced eNodeB for performing the methods described herein, in accordance with some embodiments. eNodeB 900 may include processor 902, processor memory 904 in communication with the processor, baseband processor 906, and baseband processor memory 908 in communication with the baseband processor. Mesh network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916. The second radio transceiver may be used for wirelessly backhauling eNodeB 900.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 912 and 914, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 902 for reconfiguration.

A GPS module 930 may also be included, and may be in communication with a GPS antenna 933 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 932 may also be present and may run on processor 902 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 10:
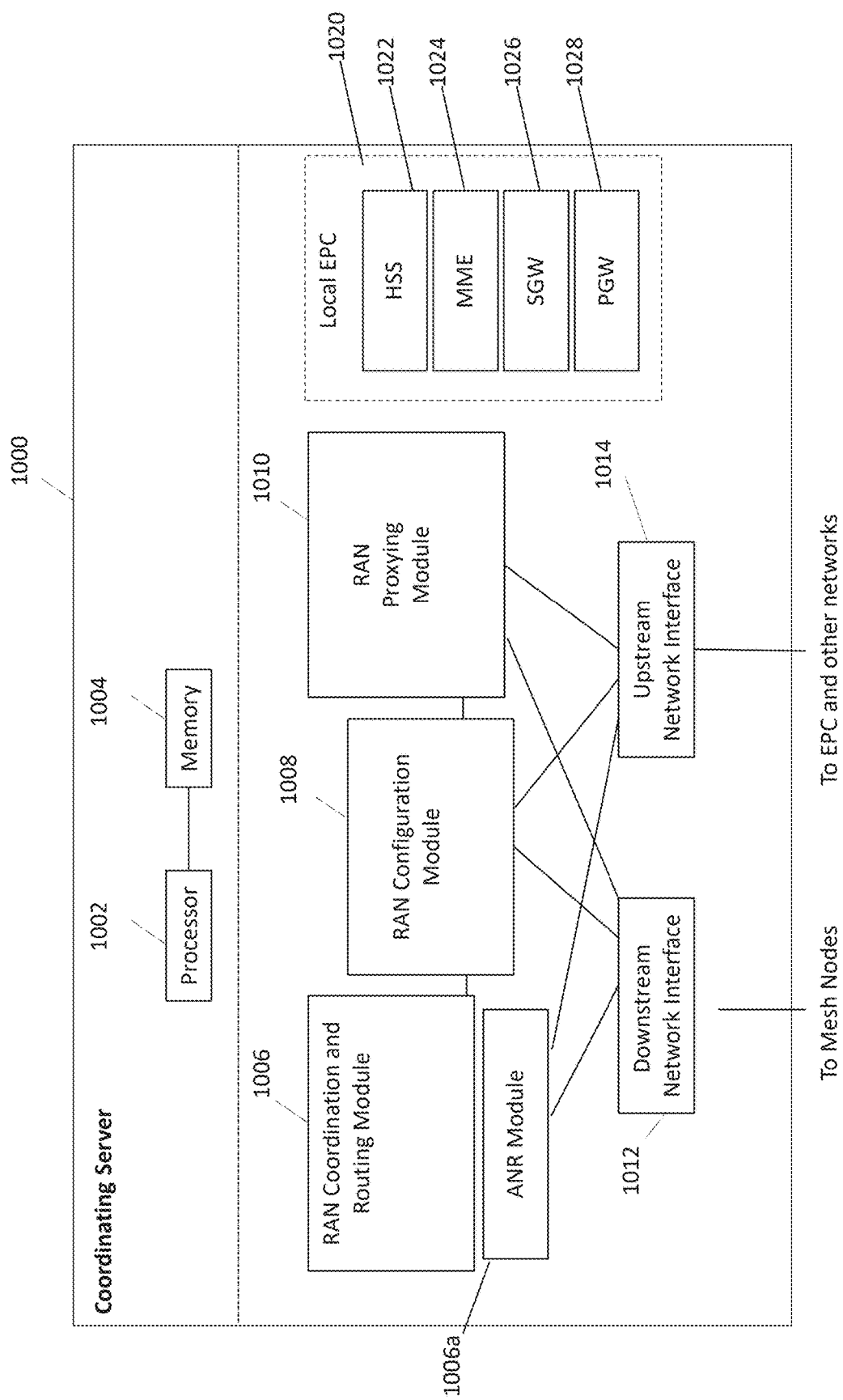
FIG. 10 is a coordinating server for providing services and performing methods as described herein, in accordance with some embodiments.

FIG. 10 is a coordinating server for providing services and performing methods as described herein, in accordance with some embodiments. Coordinating server 1000 includes processor 1002 and memory 1004, which are configured to provide the functions described herein. Also present are radio access network coordination/routing (RAN Coordination and routing) module 1006, including ANR module 1006*a*, RAN configuration module 1008, and RAN proxying module 1010. The ANR module 1006*a* may perform the ANR tracking, PCI disambiguation, ECGI requesting, and GPS coalescing and tracking as described herein, in coordination with RAN coordination module 1006 (e.g., for requesting ECGIs, etc.). In some embodiments, coordinating server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet).

Coordinator 1000 includes local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders, as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface.

The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for determining a voice encoding codec, comprising:
   discovering a packet header size used in a session using a Silence Insertion Descriptor (SID);
   inspecting downlink packet sizes coming into a receive buffer;
   determining when three consecutive packet sizes are greater than zero, then setting a first factor, a second factor, and a third factor equal to zero;
   calculating a header size; and
   determining a voice encoding codec by subtracting a header overhead value from the packet size,
   wherein the first factor comprises a current voice encoding codec size; the second factor comprises a header overhead; and a third factor comprises a Candidate SID.

2. The method of claim 1 wherein the is a Voice over LTE (VOLTE) codec.

3. The method of claim 1 further comprising, while the second factor is equal to zero:
   determining if the voice encoding codec packet size is greater than the first factor; and
   when the voice encoding codec packet size is greater than the first factor then setting the third factor to zero and setting the first factor equal to the voice encoding codec packet size.

4. The method of claim 3 further comprising determining if the voice encoding codec packet size is less than a codec size and the third factor is zero, then setting the third factor to the voice encoding codec packet size.

5. The method of claim 4 further comprising determining if the voice encoding codec packet size is equal to the third factor then setting the first factor to the voice encoding codec VOLTE packet size and setting the third factor to zero.

6. The method of claim 5 further comprising determining if the third factor is greater than zero and when the third factor is greater than zero then subtracting seven from the third factor and setting the second factor to this value.

7. The method of claim 6 further comprising waiting for a next voice encoding codec packet size and if that voice encoding codec packet size is equal to zero for 160 milliseconds and the third factor is greater than zero then subtracting seven from the third factor and setting the second factor to this value.

8. A non-transitory computer-readable medium containing instructions for
   determining a voice encoding codec which, when executed, cause the system to perform steps comprising:
      discovering a packet header size used in a session using a Silence Insertion Descriptor (SID);
      inspecting downlink packet sizes coming into a receive buffer;
      determining when three consecutive packet sizes are greater than zero, then setting a first factor, a second factor, and a third factor equal to zero;
      calculating a header size; and
      determining a voice encoding codec by subtracting a header overhead value from the packet size,
      wherein the first factor comprises a current voice encoding codec size; the second factor comprises a header overhead; and a third factor comprises a Candidate SID.

9. The non-transitory computer-readable medium of claim 8 further comprising instructions wherein while the second factor is equal to zero:
   determining if the voice encoding codec packet size is greater than the first factor; and
   when the voice encoding codec packet size is greater than the first factor then setting the third factor to zero and setting the first factor equal to the voice encoding codec packet size.

10. The non-transitory computer-readable medium of claim 9 further comprising instructions for determining if the voice encoding codec packet size is less than a codec size and the third factor is zero, then setting the third factor to the voice encoding packet size.

11. The non-transitory computer-readable medium of claim 10 further comprising instructions for determining if the voice encoding codec packet size is equal to the third factor then setting the first factor to the voice encoding codec packet size and setting the third factor to zero.

12. The non-transitory computer-readable medium of claim 11 further comprising instructions for determining if the third factor is greater than zero and when the third factor is greater than zero then subtracting seven from the third factor and setting the second factor to this value.

13. The non-transitory computer-readable medium of claim 12 further comprising instructions for waiting for a next voice encoding codec packet size and if that voice encoding codec packet size is equal to zero for 160 milliseconds and the third factor is greater than zero then subtracting seven from the third factor and setting the second factor to this value.

14. A system for determining a Voice over LTE (VOLTE) codec comprising:
   a processor;
   a radio access network interface in communication with the processor; and
   a memory, the memory communicatively coupled with the processor, the memory further comprising instructions that, when executed by the processor, cause the processor to:
   discover a packet header size used in a session used a Silence Insertion Descriptor (SID);
   inspect downlink packet sizes coming into a receive buffer;
   determine when three consecutive packet sizes are greater than zero, then set a first factor, a second factor, and a third factor equal to zero;
   calculating a header size; and
   determining a voice encoding codec by subtracting a header overhead value from the packet size;
   wherein the first factor comprises a current voice encoding codec Packet size; the second factor comprises a HeaderOverHead; and a third factor comprises a Candidate SID.

15. The system of claim 14 further comprising, while the second factor is equal to zero, the processor:
   determines if the voice encoding codec packet size is greater than the first factor; and
   when the voice encoding codec packet size is greater than the first factor then sets the third factor to zero and sets the first factor equal to the VOLTE packet size.

16. The system of claim 15 further comprising the processor determines if the voice encoding codec packet size is less than a Codec size and the third factor is zero, then sets the third factor to the voice encoding codec packet size.

17. The system of claim 16 further comprising the processor determines if the voice encoding codec packet size is equal to the third factor then sets the first factor to the voice encoding codec packet size and sets the third factor to zero.

18. The system of claim 17 further comprising the processor determines if the third factor is greater than zero and when the third factor is greater than zero then subtracts seven from the third factor and sets the second factor to this value; and the processor waiting for a next voice encoding codec packet size and if that VOLTE packet size is equal to zero for 160 milliseconds and the third factor is greater than zero then subtracts seven from the third factor and sets the second factor to this value.

* * * * *